United States Patent [19]

Kumagai et al.

[11] Patent Number: 5,728,793
[45] Date of Patent: Mar. 17, 1998

[54] PROCESS FOR PRODUCTION OF METHACRYLATE POLYMERS

[75] Inventors: Takashi Kumagai; Masahiko Moritani; Toyomitsu Shimizu; Satoshi Shimogama, all of Niihama, Japan

[73] Assignee: Sumitomo Chemical Company, Limited, Osaka-fu, Japan

[21] Appl. No.: 540,483

[22] Filed: Oct. 10, 1995

Related U.S. Application Data

[63] Continuation-in-part of Ser. No. 335,392, Nov. 3, 1994, abandoned.

[30] Foreign Application Priority Data

Nov. 5, 1993 [JP] Japan ............................ 5-276993

[51] Int. Cl.$^6$ ............................ C08F 2/02; C08F 20/12
[52] U.S. Cl. ............................ 526/329.7; 526/224; 526/88
[58] Field of Search ............................ 526/329.7, 224, 526/88

[56] References Cited

U.S. PATENT DOCUMENTS

| | | |
|---|---|---|
| 3,474,081 | 10/1969 | Bosworth . |
| 3,900,453 | 8/1975 | Shimada et al. . |
| 3,968,059 | 7/1976 | Shimada et al. . |
| 4,328,329 | 5/1982 | Novak ............................ 526/218 |
| 4,711,938 | 12/1987 | Suka et al. ............................ 526/88 |

FOREIGN PATENT DOCUMENTS

| | | |
|---|---|---|
| 484193 | 2/1973 | Japan . |
| 54-74889 | 6/1979 | Japan . |
| 226642 | 6/1990 | Japan . |
| 3111408 | 5/1991 | Japan . |
| 1286600 | 12/1970 | United Kingdom . |

Primary Examiner—Mark Nagumo
Attorney, Agent, or Firm—Sughrue, Mion, Zinn, Macpeak & Seas, PLLC

[57] ABSTRACT

Disclosed is a process for producing a methacrylate polymer, wherein a monomer feed composed of methyl methacrylate or a mixture of at least 70 weight % of methyl methacrylate and not more than 30 weight % of one or more vinyl monomers copolymerizable with methyl methacrylate is continuously bulk polymerized in a substantially perfect mixing state to give a polymer composition having a polymer content of 40–70% by weight in a continuous manner, which comprises carrying out the bulk polymerization in the reactor which is filled up with the polymer composition leaving substantially no gas phase therein and which is maintained in a thermally insulated state allowing substantially no exchange of heat with the external environment at a polymerization temperature of 120°–180° C. with an average residence time of 15 minutes to 2 hours using a radical initiator having a half-life of not more than 1 minute at the polymerization temperature at a concentration which is equal to C (mol/100 g monomer) satisfying the following relation:

$$1.1 \times 10^{-4} \cdot \exp(0.019T) < C \cdot \Theta < 3 \times 10^{-8} \cdot \exp(0.079T)$$

where $\Theta$ stands for average residence time in minutes and T for polymerization temperature in °C.

14 Claims, 1 Drawing Sheet

PROCESS FOR PRODUCTION OF METHACRYLATE POLYMERS

This is a Continuation-in-Part of application Ser. No. 08/335,392 filed Nov. 3, 1994 now abandoned.

FIELD OF THE INVENTION

This invention relates to a continuous process for producing methacrylate polymers in the manner of bulk polymerization.

BACKGROUND OF THE INVENTION

Methacrylate polymers are used in a broad range of molding applications by taking advantage of their characteristically high clarity, gloss, surface hardness, weather resistance and mechanical properties. Recently, these polymers have come to be used in large quantities in optical applications, e.g. optical disk substrates and optical devices such as Fresnel and lenticular lenses, among others.

For a commercial-scale production of such methacrylate polymers, suspension polymerization, bulk polymerization and solution polymerization techniques are known. The bulk polymerization method, for instance, includes the time-honored versions represented by the cell casting process wherein a monomer is polymerized in a cell or mold to give a resin of the desired shape, e.g. in the form of a plate, in one operation.

Recently, for the production of molding materials, processes have been proposed which comprise producing a syrup containing a polymer in a predetermined concentration in the manner of bulk polymerization, and then evaporating off the unreacted monomer in the syrup to provide the desired polymer.

By way of illustration, Japanese Unexamined Patent Publication (Kokai) No. 54-74889 describes a process employing a perfect mixing type reactor wherein methyl methacrylate monomer is bulk-polymerized at a temperature of 160°–200° C. with the gas phase being controlled at 30% or less relative to the total volume of the reaction zone.

Japanese Examined Patent Publication (Kokoku) No. 52-32665 discloses a process for producing a methacrylate molding material by continuous bulk polymerization of methyl methacrylate, wherein a mercaptan is used at a concentration of 0.01–1.0 mole %, the type and amount of the radical polymerization initiator in the monomer are set within a range satisfying a certain relation with the half-life of said initiator at a polymerization temperature, and the polymerization reaction is carried out at a temperature within the range of 130°–160° C. while maintaining the polymer content at a level equal to or below the upper limit value, the upper limit value being derived from a function of said polymerization temperature.

Japanese Examined Patent Publication (Kokoku) No. H2-26642 also discloses a process for producing a methacrylate resin by bulk polymerization wherein the type and amount of the radical initiator used are controlled within the range satisfying a certain relation with the half-life thereof at a polymerization temperature and the polymerization reaction is conducted at 160°–200° C. while the viscosity of the reaction system at the polymerization temperature is maintained at 10–500 poises.

Japanese Unexamined Patent Publication (Kokai) No. H3-111408 discloses a process for producing a methacrylate polymer from a monomer mixture composed predominantly of methyl methacrylate using a perfect mixing type reactor wherein an inert gas is first bubbled through the monomer to reduce the dissolved oxygen level in the monomer to 1 ppm or less and the polymerization reaction is carried out in the presence of a radical initiator having a half life of 0.5–120 seconds at a polymerization temperature with stirring using a stirrer providing for a stirring power of 0.5–20 kW per m³ of the reaction mixture in such a manner that the ratio of half life of the radical initiator to average residence time will be 1/200 to 1/10,000 and that the conversion will be 45–70% at a temperature of 130°–160° C.

In these processes, heat of polymerization and heat of agitation are removed from the reactor.

Moreover, in any of these processes, the polymer yield per unit reactor capacity per unit hour is, according to the descriptions in the working examples thereof, about 0.1 kg/L·Hr at best. In this specification, "L" means "liter" and "Hr" means "hour".

In the conventional bulk polymerization of a monomer feed composed predominantly of methyl methacrylate in a vessel-type reactor to provide a syrup, the evolved heat of polymerization and heat of agitation are removed by a method utilizing heat transfer, a method utilizing the latent heat of evaporation of the monomer, a method using the sensible heat of the monomer, or any combination of these.

Among these techniques, the method utilizing heat transfer includes a method of cooling with the reactor jacket, method of cooling with a heat exchanger installed within the reactor, and method of cooling with an external heat exchanger through which the reaction mixture is circulated.

With this method utilizing heat transfer, a stagnant liquid film, which is a polymer film, forms and builds up deposit on the cooling surface to reduce the efficiency of heat removal, thereby interfering with the reaction temperature control and further causing the impeller blades to come into contact with the polymer deposit grown within the reactor so that a long-term stable production run becomes difficult.

Furthermore, said polymer film is exfoliated and contaminates the reaction system, leading to production of inhomogeneous methacrylate polymer.

With the method utilizing the latent heat of evaporation of the monomer, it is essential to provide a gas phase within the reactor so as to permit vaporization of the monomer, and a fairly large amount of polymer deposit is formed on the reactor wall corresponding to the gas phase and the interface between the gas phase and the liquid phase, and these deposits tend to come off, resulting in inhomogeneity of the product methacrylate polymer.

In addition, the polymerization conditions described in the above Japanese Examined Patent Publications (Kokoku) Nos. 52-32665 and H2-26642 and Japanese Unexamined Patent Publication (Kokai) No. H3-111408 utilize the development of the so-called self-accelerating effect (gel effect) of the polymerization reaction. Such polymerization reactions tend to be easily affected by extrinsic disturbances such as the effect of dissolved oxygen present in the monomer, among others, so that sophisticated control of heat removal is necessary for constantly conducting a stable polymerization reaction for a long period of time.

SUMMARY OF THE INVENTION

It is therefore an object of this invention to provide a process for producing a methacrylate polymer, which is capable of achieving a high conversion even when the monomer residence time in the reactor is short, and therefore capable of achieving a high polymer yield per unit time per unit reactor volume, namely high productivity, and by which polymer type or grade is easily changed with a reduced amount of carryovers.

It is a further object of this invention to provide a process for producing a methacrylate polymer which can provide for stable polymerization even in the presence of extrinsic disturbing factors such as the effect of dissolved oxygen in the monomer, which can remarkably suppress oligomer formation, which involves substantially no formation of deposit on the reactor wall even in a long production run and which can give a homogeneous methacrylate polymer.

This invention provides a process for producing a methacrylate polymer, wherein a monomer feed composed of methyl methacrylate or a mixture of at least 70 weight % of methyl methacrylate and not more than 30 weight % of one or more vinyl monomers copolymerizable with methyl methacrylate is continuously bulk polymerized in a substantially perfect mixing state to give a polymer composition having a polymer content of 40–70% by weight in a continuous manner in a reactor, and wherein (i) the reactor is filled up with the polymer composition leaving substantially no gas phase therein and the polymer composition is stirred, (ii) the reactor is maintained in a thermally insulated state allowing substantially no exchange of heat with the external environment, (iii) the polymerization is conducted at a polymerization temperature in the range of 120° to 180° C., (iv) the average residence time is maintained in the range of 15 minutes to 2 hours, (v) a radical initiator having a half-life of not more than 1 minute at the polymerization temperature is used, and (vi) the radical initiator is adjusted to a concentration C (mol/100 g monomer) satisfying the following relation:

$$1.1 \times 10^{-4} \cdot \exp(0.019T) < C \cdot \Theta < 3 \times 10^{-8} \cdot \exp(0.079T) \tag{1}$$

where $\Theta$ represents average residence time (minute) and T represents polymerization temperature (°C.)

DETAILED DESCRIPTION OF THE INVENTION

Figure 1:
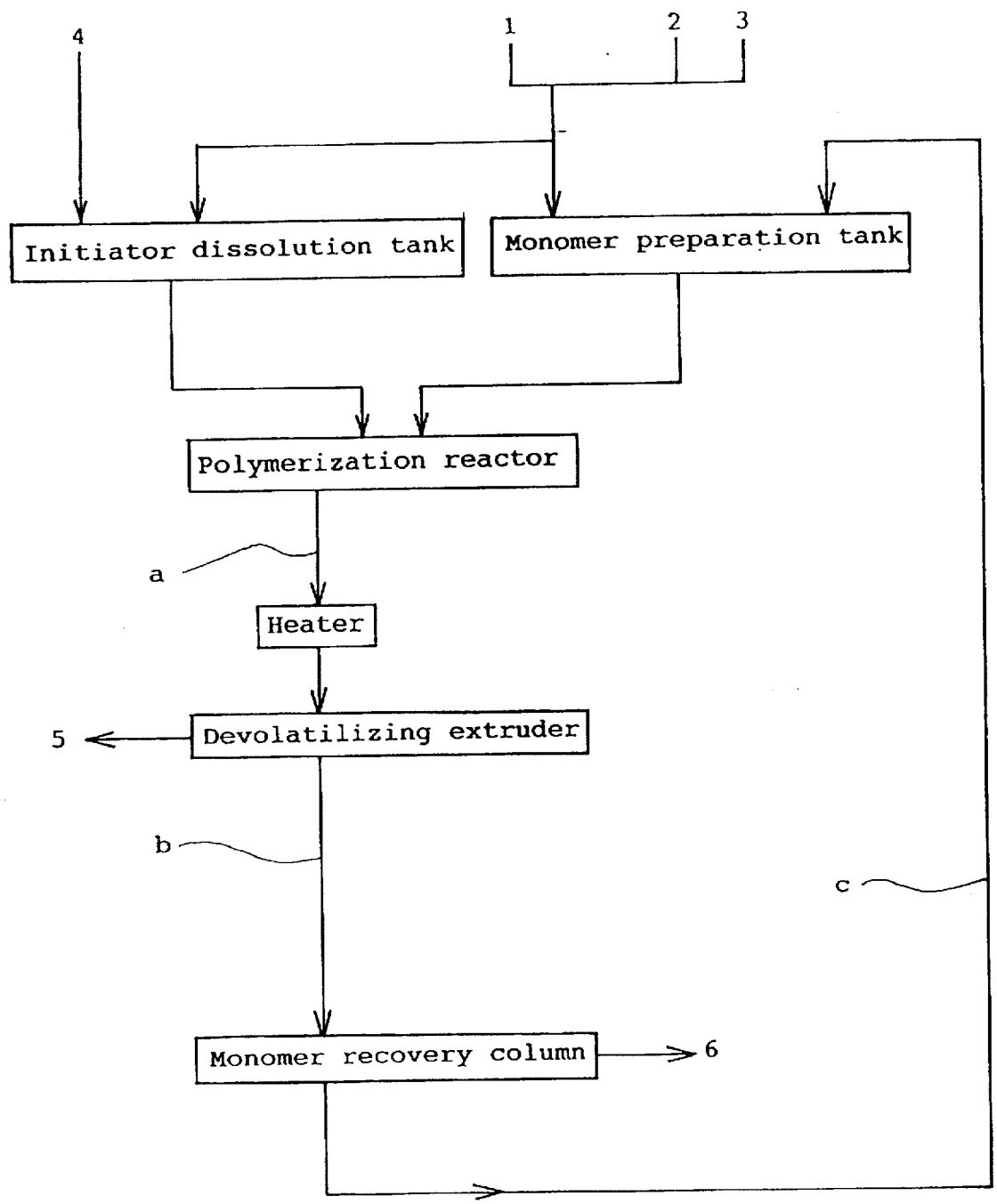
FIG. 1 is a flow diagram of the process used in the examples of this invention.

Specifically, the present invention provides a process for producing a methacrylate polymer, wherein a monomer feed composed of methyl methacrylate or a mixture of at least 70 weight % of methyl methacrylate and not more than 30 weight % of one or more vinyl monomers copolymerizable with methyl methacrylate is continuously bulk polymerized in a substantially perfect mixing state to give a polymer composition having a polymer content of 40–70% by weight in a continuous manner in a reactor capable of perfectly mixing the polymer composition, which comprises the steps of (a) carrying out the bulk polymerization in the reactor which is filled up with the polymer composition leaving substantially no gas phase therein and which is maintained in a thermally insulated state allowing substantially no exchange of heat with the external environment at a polymerization temperature of 120°–180° C. with an average residence time of 15 minutes to 2 hours using a radical initiator having a half-life of not more than 1 minute at the polymerization temperature at a concentration which is equal to C (mol/100 g monomer) satisfying the following relation:

$$1.1 \times 10^{-4} \cdot \exp(0.019T) < C \cdot \Theta < 3 \times 10^{-8} \cdot \exp(0.079T)$$

where $\Theta$ stands for average residence time in minutes and T for polymerization temperature in °C., (b) continuously withdrawing the polymer composition from the reaction zone (i.e., from the reactor), and (c) continuously removing volatile contents from the withdrawn polymer composition.

The polymer composition means the content present in the bulk polymerization reaction system of the invention, and comprises a methacrylate polymer formed by the bulk polymerization and fed or unreacted monomer or monomer mixture, the methacrylate polymer being present in an amount of 40–70% by weight based on the total weight of the composition.

Said polymer composition is sometimes referred to as "liquid polymer composition", "syrup" or "polymerization mixture" in the description that follows.

The term "monomer feed composed predominantly of methyl methacrylate" as used throughout this specification means methyl methacrylate as such or a mixture of at least 70 weight %, preferably at least 80 weight %, of methyl methacrylate and up to 30 weight %, preferably up to 20 weight %, of at least one of other vinyl monomers copolymerizable with methyl methacrylate.

Said other vinyl monomers copolymerizable with methyl methacrylate includes, for example, other esters of methacrylic acid such as ethyl methacrylate, propyl methacrylate, butyl methacrylate, benzyl methacrylate, cyclohexyl methacrylate, etc.; esters of acrylic acid such as methyl acrylate, ethyl acrylate, propyl acrylate, butyl acrylate, 2-ethylhexyl acrylate, etc.; unsaturated carboxylic acids and anhydrides thereof, such as acrylic acid, methacrylic acid, maleic acid, itaconic acid, maleic anhydride, itaconic anhydride, etc.; hydroxy group-containing monomers such as 2-hydroxyethyl acrylate, 2-hydroxypropyl acrylate, monoglyceryl acrylate, 2-hydroxyethyl methacrylate, hydroxypropyl methacrylate, monoglyceryl methacrylate, etc.; nitrogen-containing monomers such as acrylamide, methacrylamide, acrylonitrile, methacrylonitrile, diacetone acrylamide, dimethylaminoethyl methacrylate, etc.; and epoxy group-containing monomers such as allyl glycidyl ether, glycidyl acrylate, glycidyl methacrylate, etc., and styrenic monomers such as styrene, α-methylstyrene and so on.

In the present invention, the bulk polymerization is conducted in a continuous manner.

The term "perfect mixing" means the following mixing state: when a fluid stream continuously and constantly passes into and out of a well stirred vessel, the composition of the fluid is uniform anywhere within the vessel and therefore is identical to the composition of the effluent stream. See ENCYCLOPEDIA CHIMICA, published by Kyoritsu Shuppan Kabushiki Kaisha in 1960, Vol. 2, page 653.

The term "a substantially perfect mixing state" herein is used to mean a mixing state wherein the polymer content (i.e., polymer concentration) of the polymer composition within the polymerization reactor is identical to, or only very slightly different from, the polymer content (i.e., polymer concentration) of the polymer composition flowing out of the reactor.

In the present invention, a polymerization reactor capable of achieving such substantially perfect mixing state is used.

The polymerization reactor to be used in the practice of this invention is a vessel type reactor equipped with a stirring means. The stirring means just mentioned is one capable of achieving a perfect mixing of the liquid contents within the reaction vessel. The shape of the stirrer blade that can be adopted is not particularly limited so far as it achieves perfect mixing. Examples thereof include Max Blend blade (tradename; product of Sumitomo Heavy Industries, Ltd.), paddle blade, double helical ribbon blade, MIG (Mehrstufen-Impuls-Gegenstomruehrer) blade, Fullzone blade (tradename; product of Shinko Pantec Co., Ltd.), etc.

For enhanced stirring effects, it is preferable to install one or more baffles.

Needless to say, the stirring efficiency is preferably as high as possible, but the use of a stirring power greater than necessary should be avoided, since it would only contribute to accumulate additional heat in the reaction vessel.

For this reason, the stirring power is usually in the range of about 0.5 to 20 kW/m$^3$, preferably 1 to 15 kW/m$^3$. As the viscosity of the reaction mixture, i.e., the polymer content therein, increases, the stirring power is usually increased.

The interior of the reaction vessel is filled up, leaving substantially no gas phase. This absence of gas phase prevents the formation and buildup of the polymer deposit on the reactor internal wall surface corresponding to the gas phase and gas-liquid interface which would otherwise exist, and consequently deterioration of the product polymer quality due to contamination with such deposit is prevented.

Furthermore, the full capacity of the reactor can be utilized with the result that the productivity increases.

The most expedient method for filling up the reactor is to dispose the reaction mixture outlet at the highest part of the reactor. For ensuring that no monomer gas be evolved in the reactor, the internal pressure of the reactor is set above the vapor pressure thereof at a temperature of the reaction system. This pressure is generally about 10–20 kg/cm$^2$ (i.e., $9.8 \times 10^5$ to $2.0 \times 10^6$ nt/m$^2$).

In the practice of this invention, the reactor is kept substantially insulated thermally so that there will be no exchange of heat between the reactor interior and the external atmosphere. In other words, the reactor exterior wall is maintained at a temperature which is substantially the same as the temperature of interior of the reactor.

For achieving this substantial thermal insulation, a jacket is installed, for example, on the external wall of the reactor and a heating medium such as steam is circulated through the jacket in such a manner that the external wall temperature of the reactor will follow the internal temperature and remain substantially the same as the internal temperature. Such temperature control can be easily conducted by one skilled in the art, for example, by using a system conventionally used for effecting such temperature control.

To maintain the reactor in a thermally insulated state as mentioned above is intended to prevent the formation of polymer deposit on the internal wall of the reactor and to achieve a self-control function which stabilizes the polymerization and suppresses a runaway or uncontrollable reaction.

It is meaningless to increase the external wall temperature of the reactor too high beyond the reaction mixture temperature, since it would add an unnecessary heat to the reaction mixture.

The temperature difference between the interior of the reactor and the external wall of the reactor is preferably as small as possible, but actually it is sufficient to control the reactor interior temperature and the reactor exterior wall temperature in such a manner that the temperature difference is approximately less than 5 degrees (°C.).

The heat evolved in the reaction zone, that is to say, the heat of polymerization plus the heat of agitation, is balanced against the heat carried away by the syrup emerging out of the reactor and the feed monomer temperature (sensible heat), so that the polymerization reaction temperature can be maintained within the range of 120° to 180° C.

The heat carried away by the syrup is dependent on the amount and specific heat of the syrup and the polymerization temperature.

The polymerization temperature, which is dependent on the type of radical initiator used and the like, is about 120°–180° C., preferably 130°–170° C.

If the polymerization temperature is too high, the syndiotactic structure of the product polymer tends to decrease, and the proportion of oligomers increases, and the heat resistance of the resin is sacrificed.

In feeding the monomer to the reactor, the temperature of the monomer is controlled so that a predetermined polymerization temperature will be established by the heat balance within the reactor.

In other words, the feed monomer temperature $T^1$ is set within the range defined by the following relation (3):

$$T^1 = (0.8 \text{ to } 1.2) \times \{T - (2.9P + 1.81F)\} \tag{3}$$

wherein P represents conversion in %, F represents stirring power in kW/m$^3$, and T represents polymerization temperature in °C.

In the above relation (3), 2.9 is the conversion factor for a reaction temperature increase per weight % of conversion and 1.81 is the conversion factor for a temperature increase per kW/m$^3$ of stirring power.

The monomer to be fed to the polymerization reactor need not be limited to a fresh monomer, but may be an adjusted composition containing the recovered unreacted monomer (s).

To preclude the influence of dissolved oxygen in the preparation of the monomer, it is conventionally common practice to bubble an inert gas through the monomer preparation tank or deaerate the monomer under decompression in order to remove dissolved oxygen therefrom. However, the process of this invention does not require such a procedure in strict sense, and the desired polymerization can be carried out in a stable manner even if the dissolved oxygen level in the monomer is about 1.5–3 ppm.

For the purpose of removing impurities before introducing the prepared monomer feed into the reactor, the monomer feed is preferably filtered through a filter of the proper mesh size, and this is especially desirable when the product polymer is intended for use as an optical material.

The average residence time is about 15 minutes to about 2 hours, preferably about 20 minutes to about 1.5 hours.

The average residence time is defined by the following equation $$\Theta = V/F$$

wherein $\Theta$ is average residence time in minute, V is a capacity of the reactor in liter and F is a monomer feed rate in liter/minute. In the invention, the specific gravity of the monomer or monomer mixture and the specific gravity of the polymer composition (syrup) are usually in the neighborhood of 1, and therefore can substantially reasonably be assumed to be 1 for calculating the average residence time $\Theta$. If the residence time is excessively prolonged, the formation of the dimer, trimer and other oligomers is increased to thereby detract from the heat resistance of the resulting product. The average residence time can be controlled by adjusting the monomer feeding rate per unit time.

The radical initiator for use in the practice of this invention is virtually not limited in type only if its half life at the polymerization temperature is not in excess of 1 minute, and is particularly in the range of 0.01 second to 1 minute.

Any radical initiator with a half life of over 1 minute is undesirable because the reaction rate will then be low.

The relationship between the temperature and the half life of the radical initiator can be found in the literature on respective initiators and the technical bulletins published by the manufacturers.

In this specification and claims, the literature relied on for azo compounds is "Azo Polymerization Initiators" published by Otsuka Chemical Company, Ltd. and that for organic peroxides is "Product Brochure (Organic Peroxides)" published by Sanken Chemical Co., Ltd.

The radical initiator which can be used includes azo compounds such as azobisisobutyronitrile, azobisdimethylvaleronitrile, azobiscyclohexanecarbonitrile, 1,1'-azobis(1-acetoxy-1-phenylethane), dimethyl 2,2'-azobisisobutyrate, 4,4'-azobis-4-cyanovaleric acid, dimethyl 2,2'-azobis(2-methylpropionate), etc., and organic peroxides such as benzoyl peroxide, lauroyl peroxide, acetyl peroxide, caprylyl peroxide, 2,4-dichlorobenzoyl peroxide, isobutyl peroxide, acetylcyclohexylsulfonyl peroxide, t-butyl peroxypivalate, t-butyl peroxy-2-ethylhexanoate, isopropyl peroxydicarbonate, isobutyl peroxydicarbonate, sec-butyl peroxydicarbonate, n-butyl peroxydicarbonate, 2-ethylhexyl peroxydicarbonate, bis(4-t-butylcyclohexyl) peroxydicarbonate, t-amyl peroxy-2-ethylhexanoate, 1,1,3,3-tetramethylbutyl peroxyethylhexanoate, 1,1,2-trimethylpropyl peroxy-2-ethylhexanoate, t-butyl peroxyisopropylmonocarbonate, t-amyl peroxyisopropylmonocarbonate, 1,1,3,3-tetramethylbutyl peroxyisopropylmonocarbonate, 1,1,2-trimethylpropyl peroxyisopropylmonocarbonate, 1,1,3,3-tetramethylbutyl peroxyisononanoate, 1,1,2-trimethylpropyl peroxyisononanoate, t-butyl peroxybenzoate, 1,1-bis(tert-butylperoxy)-3,3,5-trimethylcyclohexane, 1,1-bis(tert-butylperoxy)cyclohexane, etc. One or more of these polymerization initiators is(are) used according to the polymerization temperature.

The concentration C of the radical initiator (mol/100 g monomer) for use in the process of this invention is suitably selected according to the aforementioned relation (1). If the concentration of the radical initiator is below the lower limit defined by relation (1), the desired conversion will not be attained. Conversely when the initiator concentration is too high, the resulting polymer will be insufficient in thermal stability.

The concentration of the initiator is generally 0.001–1 weight % based on the monomer feed.

The radical initiator is usually fed to the reactor as dissolved in the monomer.

It is preferable that the concentration C of the radical initiator (mol/100 g monomer) is within the range satisfying the following relation (2):

$$1.1\times10^{-4}\cdot\exp(0.019T) < C\cdot\Theta < 3\times10^{-5}\cdot\exp(0.034T) \quad (2)$$

where $\Theta$ and $T$ are as defined hereinbefore.

In the bulk polymerization according to this invention, the selection of the reaction conditions according to the above description leads to the self-accelerating effect (gel effect) in the radical polymerization, which can stably impart a favorable effect to the polymerization reaction.

Generally, the gel effect develops in a solution (monomer/polymer/(solvent)) having a fairly high polymer content. Thus, when the polymer content is high, the viscosity of the solution is high and therefore the mobility of the polymer radicals is decreased with the result that the polymerization rate is increased because the termination reaction is hard to occur. Therefore, inherently a runaway reaction tends to take place. In order to avoid this uncontrollable reaction, it has been conventionally necessary to very elaborately control the residence time, reaction temperature and radical initiator concentration.

However, in the process of this invention, such runaway reaction is inhibited by simply conducting the polymerization in such a manner that there is substantially no temperature difference between the interior and exterior of the reactor to establish a thermally insulated state with substantially no exchange of heat with the external environment, and therefore the polymerization proceeds in a stable manner.

Thus, even if a transient increase in the evolution of heat raises the internal temperature of the reactor, the temperature of the exterior wall of the reactor is also increased accordingly so that the viscosity of the reaction mixture is lowered with the result that the mobility of the polymer radicals is increased to enable the termination reaction to occur frequently. Therefore, the total polymerization rate is lowered and the evolution of heat is reduced to lower the temperature, thus resulting in a conversion commensurate with the concentration of the radical initiator, thus developing said self-control function.

As a consequence, a consistently stable polymerization reaction can be carried out even if external disturbances such as fluctuation in the dissolved oxygen level in the monomer occur.

The conversion from the monomer to the polymer in the reactor is 40–70 weight %. Because the content of the reactor is maintained in a substantially perfect mixing state, this conversion corresponds to the polymer content of the syrup emerging out of the reactor. That is to say, the conversion is equal to the concentration of the polymer in the syrup.

Higher conversion means not only higher productivity, but also the increased viscosity of the reaction system, and requires a greater stirring force.

On the other hand, the lower the conversion is, the larger is the unreacted monomer recovery load.

The reaction parameters mentioned hereinbefore can be readily selected by one skilled in the art. For example, the concentration of the radical initiator and the amount of the monomer feed to be introduced into the reactor may be calculated as follows.

When the amount of the polymer to be produced is predetermined, a target for the residence time $\Theta$ and a target for the polymer content in the syrup are selected, and the target polymerization temperature is selected. Then the temperature range of the monomer feed is roughly estimated according to relation (3) using the above polymer content and the polymerization temperature values and further using the stirring power value which is roughly assessed from these values. Thereafter, the concentration range of the radical initiator is calculated according to relation (1).

So far as the radical initiator concentration is within said range calculated according to relation (1) and the reactor is kept substantially insulated thermally, the reaction would never run away or become uncontrollable. However, it is generally preferable to start and conduct the reaction as follows. First, the radical initiator is fed at approximately the lowest level in the initiator concentration range. Then, with an increase in the internal temperature, the jacket temperature is correspondingly elevated to maintain the state of thermal insulation until the temperature reaches an equilibrium state. The initiator concentration is adjusted so as to achieve an equilibrium at the target temperature. When the amount of the polymer that is produced does not reach the predetermined level, the amount thereof can be controlled by adjusting the initiator concentration within the above range.

In order to control the molecular weight of the product polymer, a conventional monofunctional or polyfunctional chain transfer agent can be employed, if so desired.

The chain transfer agent that can be used includes alkylmercaptans such as propyl mercaptan, butyl mercaptan, hexyl mercaptan, octyl mercaptan, 2-ethylhexyl mercaptan, dodecyl mercaptan, etc.; aromatic mercaptans such as phenyl mercaptan, thiocresol, etc.; mercaptans containing not more than 18 carbon atoms, such as ethylenethioglycol, and thioglycolic or 3-mercaptopropionic esters of polyhydric alcohols such as ethylene glycol, neopentyl glycol, trimethylolpropane, pentaerythritol, dipentaerythritol, tripentaerythritol, sorbitol, etc.

Also, 1,4-dihydronaphthalene, 1,4,5,8-tetrahydronaphthalene, β-terpinene, terpinolene, 1,4-cyclohexadiene, 1,4-cyclohexadiene, α-methylstyrene dimer, hydrogen sulfide, etc. can likewise be employed.

These agents can be used singly or at least 2 of them may be used in combination.

The amount of such chain transfer agent varies with different kinds of agents but taking a mercaptan as an example, the proper amount is 0.01 to 3 parts by weight, preferably 0.05 to 1 part by weight, per 100 parts by weight of the monomer or monomer mixture. The above range is recommended because the mechanical properties of the polymer are not adversely affected and a sufficiently high heat stability of the polymer is maintained.

The syrup withdrawn from the reactor is preheated, if required, to evaporate off the volatile matter which is predominantly composed of unreacted monomer, leaving the desired polymer.

For this transfer of the syrup, the method described in Japanese Examined Patent Publication (Kokoku) No. H4-48802 is suitable.

The technique for separation of the volatile matter includes the method employing a devolatilizing extruder, and the known techniques described in Japanese Examined Patent Publications (Kokoku) Nos. 51-29914 and 52-17555, Japanese Unexamined Patent Publications (Kokai) Nos. H1-53682, 62-89710 and H3-49925, among others, can be utilized.

The unreacted monomer thus separated can be reused as the feed monomer for polymerization.

In this connection, the impurities contained in the unreacted monomer, such as compounds contaminated or by-produced in the monomer manufacturing processes, the dimer, trimer and other oligomers and the residue (decomposition product) of the radical initiator, accumulate progressively, whereby the resulting polymer will be colored. It is, therefore, recommended to remove the impurities by distillation or adsorption as disclosed in Japanese Examined Patent Publication (Kokoku) No. 54-42035.

According to the invention, as applied to the production of a methacrylate polymer by the continuous bulk polymerization of a monomer feed composed predominantly of methyl methacrylate in a perfect mixing type reactor, a long-term polymerization run can be achieved with good stability and without a runaway reaction despite the high output per unit hour per unit reactor capacity, that is to say high productivity, and the type or grade of the product polymer is easily changed with a minimum of carryovers.

Furthermore, the formation of oligomers is low and the product methacrylate polymer is homogeneous and stable in quality so that it is also very suited for use as an optical material.

EXAMPLES

The following examples are intended to describe this invention in further detail and should by no means be construed as defining the scope of the invention.

The production process used in the examples is illustrated in the flow chart of FIG. 1.

In FIG. 1, numerals 1–6 and symbols a–c indicate the following.

1: methyl methacrylate
2: methyl acrylate
3: a chain transfer agent
4: a polymerization initiator
5: a product polymer
6: a liquid to be disposed
a: liquid polymer composition (syrup)
b: unreacted monomers and impurities
c: recovered monomers to be recycled The following are generalized descriptions of the main equipment used.

Monomer preparation tank: 20L, SUS304, equipped with a paddle agitator and a jacket Initiator dissolution tank: 10L, SUS304, equipped with a paddle agitator and a jacket Polymerization reactor: 10L, SUS304, equipped with a double helical ribbon blade stirrer (250 rpm) and a jacket Heater: 16.7 mm (inside diameter)×3 m (long), equipped with a jacket Devolatilizing extruder: a twin screw extruder (TEX-30) manufactured by The Japan Steel Works, Co., Ltd. (different direction rotating type, screw diameter 30 mm, cylinder length 1200 mm), equipped with one rear vent and 3 front vents Monomer recovery column: 100 mm (inside diameter)×3 m (long), SUS304, ⅜ inch SUS Raschig ring-packed column, concentration part length 0.7 m, recovering part length 0.3 m.

Dissolved oxygen concentration meter: DO Meter UC-12-SOL manufactured by Central Kagaku Co., Ltd.

The methods used for the evaluation of product polymers were as follows.

Yellowness index: Using a 40 mm extruder equipped with a T-die (manufactured by Tanabe Plastics Machinery Co., Ltd.), the polymer was extruded into a flat plate at 250° C. and passed through a 3-roller polishing equipment at about 100° C. to provide a 3 mm-thick plate. From this extruded plate, square-shaped specimens (5 cm×5 cm) were taken and yellowness index (YI) of each specimen was determined using the SZ-Σ80 spectroscopic color-difference meter manufactured by Nippon Denshoku Industries Co., Ltd. in accordance with JIS K7103.

Polymer homogeneity: Using a 40 mm extruder equipped with a T-die (manufactured by Tanabe Plastics Machinery Co., Ltd.), the polymer was extruded at 250° C. to provide a plate, from which specimens measuring 10 cm×10 cm×3 mm (thickness) were taken. The surface each of the specimens was examined under a magnifying glass and fish eyes ($\geq 0.25$ mm in diameter) consisting of an unmelted fraction of high molecular weight were counted as a measure of polymer homogeneity.

Reduced viscosity: The viscosity of a 0.1 weight % solution of the resin in chloroform was measured with an Ubbelohde Viscometer at 25° C.

Melt flow rate (MFR): Using a melt indexer manufactured by Takara Industries Co., Ltd., the MFR was determined at 230° C. under a load of 3.8 kg in accordance with JIS K7210.

Deposition of polymer on the reactor internal wall: After completion of a continuous operation, the reactor was disassembled and its interior was visually inspected.

Example 1

As the starting monomers, methyl methacrylate (hereinafter "MMA"; product of Nippon Methacryl Monomer Co., Ltd.) and methyl acrylate (hereinafter "MA"; product of Toagosei Chemical Industry Co., Ltd.) were used. As the radical initiator, azobisisobutyro-nitrile (hereinafter "AIBN") was used and as the chain transfer agent, n-octylmercaptan (hereinafter "OM") was used.

The initiator dissolution tank was charged with MMA and, as final concentrations, 1 weight % of MA, 0.24 weight % of AIBN and 0.22 weight % of OM, and the charge was stirred well to dissolve AIBN thoroughly to provide an initiator solution. The internal temperature of the initiator dissolution tank was maintained at 5° C. by circulating a cooling medium through the jacket.

This initiator solution was fed by a pump to the polymerization reactor at a rate of 3.0 kg/Hr.

The monomer preparation tank was continuously charged with MMA and, as final concentrations, 1 weight % of MA and 0.22 weight % of OM and the temperature was controlled at 20° C.

While nitrogen was introduced into the monomer preparation tank, the concentration of dissolved oxygen in the monomer mixture fed to the polymerization reactor was 1.8–2.7 ppm. The thus-prepared monomer mixture was pump-fed to the polymerization reactor at a rate of 27 kg/Hr.

The above-mentioned initiator solution and monomer mixture were fed to the bottom of the polymerization reactor and continuously polymerized under the following conditions: average residence time=20 min. (this value was calculated assuming that each of the specific gravities of the initiator solution, of the monomer mixture and of the liquid polymer composition (syrup) is 1.), and reactor internal pressure=16 kg/cm². After the initiation of the reaction, the reactor internal temperature became steady at about 160° C. and thereafter remained at 160°±2° C., and therefore the jacket temperature was controlled so as to follow the reactor internal temperature variation. The stirring power was 5.6 KW/m³.

The resultant liquid polymer composition (syrup) was withdrawn from the top of the reactor and fed to the heater.

In the heater, the liquid polymer composition (syrup) was heated to 200° C. by circulating a heating medium through the jacket. The heated composition (syrup) was then fed to the devolatilizing extruder.

With the vents of the devolatilizing extruder set to a reduced pressure and the cylinder temperature set to about 250° C., the liquid polymer composition (syrup) was extruded, and the volatile fraction composed predominantly of the unreacted monomers was withdrawn from the vents and fed to the downstream monomer recovery column. The polymer melt was extruded in a strand form, cooled with water and cut to obtain polymer pellets in an average yield of 13.5 kg/Hr. This means that the conversion at this stage was about 45%.

The volatile fraction emerging from the devolatilizing extruder was fed to the monomer recovery column where it was continuously distilled using a reflux ratio of 1. The distillate from the top of the monomer recovery column was recycled to the monomer preparation tank.

The above operation was continued for 6 consecutive months and the polymerization reaction was then terminated.

One kilogram of the polymer was sampled every week from the beginning of polymerization and the samples were mixed together. The mixture was evaluated. In addition, the polymerization reactor was disassembled and inspected. The results of the evaluation are shown in Table 2.

Examples 2–5

The procedure of Example 1 was repeated with the exception of using the conditions shown in Table 1. The results are shown in Table 2.

Comparison Example 1

The procedure of Example 1 was repeated except that the temperature of the monomer feed was 40° C. and the jacket temperature was 122° C. (reactor internal temperature was 160° C.).

One kilogram of the polymer was sampled every week from the beginning of polymerization and mixed together. The mixture was evaluated. The results are shown in Table 2.

On day 15 after the start of operation, the stirring power showed a sudden increase and, therefore, the reaction was terminated. The reactor was disassembled and inspected. Grown polymer deposit was found on the internal wall. The reduced viscosity of the polymer deposited on the reactor wall was 0.97.

Example 6

The initiator dissolution tank was charged with MMA and, as final concentrations, 1 weight % of MA, 0.19 weight % of AIBN and 0.235 weight % of OM, and the charge was stirred until AIBN was completely dissolved to provide an initiator solution. The internal temperature of the initiator dissolution tank was maintained at 5° C. by circulating a cooling medium through the jacket.

The initiator solution thus prepared was pump-fed to the polymerization reactor at a rate of 2.0 kg/Hr.

The monomer preparation tank was continuously fed with MMA and, as final concentrations, 1 weight % of MA and 0.235 weight % of OM, and the temperature was set at −5° C.

Nitrogen gas was introduced into the monomer preparation tank, and the concentration of dissolved oxygen in the monomer mixture fed to the polymerization reactor was 1.8–2.7 ppm. The monomer mixture thus prepared was pump-fed to the reactor at a rate of 18 kg/Hr.

The above-mentioned initiator solution and monomer mixture were fed to the bottom of the polymerization reactor and continuously polymerized under the following conditions: average residence time=30 min. (this value was calculated assuming that each of the specific gravities of the initiator solution, of the monomer mixture and of the liquid polymer composition (syrup) is 1.), reactor internal temperature and jacket temperature=150°±2° C. and reactor internal pressure=16 kg/cm². The stirring power was 5.8 KW/m³.

The resultant liquid polymer composition (syrup) was withdrawn from the top of the reactor and fed to the heater. The subsequent procedures were conducted in the same manner as the corresponding procedures described in Example 1, thereby giving polymer pellets in an average yield of 9.8 kg/Hr. This means that the conversion at this stage was about 49%.

The operation under the above conditions was continued for 3 days and, then, the feeding rate of the initiator solution was increased to 2.4 kg/Hr.

As the internal temperature of the reactor rose by degrees, the jacket temperature was also raised as much. After 2 hours, both the reactor internal temperature and the jacket temperature became steady at 160° C. There was no change in stirring power during the intervening period.

The operation under the above conditions was continued for one day, during which polymer pellets were obtained in an average yield of 10.4 kg/Hr. This means that the conversion at this stage was about 52%.

The feeding rate of the initiator solution was then returned to 2.0 kg/Hr. As a consequence, the internal temperature of the reactor dropped gradually. Therefore, the jacket temperature was also lowered gradually at the same rate. After about 1.5 hours, both the reactor internal temperature and the jacket temperature became steady at 150° C. There was no change in stirring power during the intervening period.

The operation under the above conditions was continued for one day and polymer pellets were obtained in an average yield of 9.8 kg/Hr. This means that the conversion at this stage was about 49%.

Thus, even when the initiator feeding rate was altered, the polymerization reaction changed smoothly and when the initial conditions were restored, the polymerization reaction was also brought back to the initial state with good reproducibility.

Comparison Example 2

The operation under the initial conditions used in Example 6 was continued for 3 days, after which the feeding rate of the initiator solution was similarly increased to 2.4 kg/Hr.

Then, as the internal temperature of the polymerization reactor increased gradually, the jacket temperature was progressively lowered so as to maintain the reactor internal temperature at 150° C.

About 2 hours after the change of the initiator feeding rate, the internal temperature of the reactor became 150° C. and the jacket temperature became 100° C. Then, the stirrer suddenly stopped due to an overload. Therefore, the feeding of the monomer and initiator solution was immediately stopped to terminate the reaction.

The abbreviations used in Table 1 have the following meanings.

AIBN: azobisisobutyronitrile

TMBP: 1,1,3,3-tetramethylbutyl peroxyisopropyl monocarbonate

BPIC: t-butyl peroxyisopropylcarbonate

MA: methyl acrylate

EA: ethyl acrylate

τ: half-life at polymerization temperature

TABLE 1

| | Average residence time, min. | Comonomer Type | Comonomer Wt. % | Monomer temperature, °C. | Polymerization temperature, °C. | Initiator Type | Initiator concentration mol/100 g monomer |
|---|---|---|---|---|---|---|---|
| Example | | | | | | | |
| 1 | 20 | MA | 1 | 20 | 160 | AIBN | $1.46 \times 10^{-4}$ |
| 2 | 40 | MA | 15 | 5 | 147 | TMBP | $7.93 \times 10^{-5}$ |
| 3 | 100 | EA | 1 | -5 | 168 | AIBN | $8.54 \times 10^{-5}$ |
| 4 | 30 | MA | 6 | -10 | 174 | TMBP | $1.50 \times 10^{-4}$ |
| 5 | 30 | MA | 1 | -10 | 179 | BPIC | $1.14 \times 10^{-4}$ |
| Comparison Example | | | | | | | |
| 1 | 20 | MA | 1 | 40 | 160 | AIBN | $1.46 \times 10^{-4}$ |

| | τ sec. | C · Θ (× 10⁻³) LL | C · Θ (× 10⁻³) UL¹ | C · Θ (× 10⁻³) UL² | OM, Wt. % | Stirring power, KW/m³ | Conversion, % | Reduced viscosity, g/dl |
|---|---|---|---|---|---|---|---|---|
| Example | | | | | | | | |
| 1 | 1.31 | 2.92 | 2.30 | 9.26 | 6.91 | 0.220 | 5.6 | 44.8 | 0.64 |
| 2 | 46.2 | 3.17 | 1.80 | 3.32 | 4.44 | 0.255 | 5.0 | 46.1 | 0.60 |
| 3 | 0.67 | 8.54 | 2.68 | 17.4 | 9.07 | 0.200 | 7.0 | 56.2 | 0.63 |
| 4 | 4.42 | 4.50 | 3.00 | 28.0 | 11.11 | 0.070 | 7.7 | 58.8 | 0.83 |
| 5 | 7.09 | 3.42 | 3.30 | 41.5 | 13.19 | 0.155 | 6.8 | 60.9 | 0.63 |

TABLE 1-continued

| Comparison Example | | | | | | | | | |
|---|---|---|---|---|---|---|---|---|---|
| 1 | 1.31 | 2.92 | 2.30 | 9.26 | 6.91 | 0.220 | 5.8 | 45.1 | 0.64 |

| | | Yellowness index (YI) | Homogeneity | Deposit | | Output kg/L · hr | Run |
|---|---|---|---|---|---|---|---|
| | MFR | | | Yes/No | Reduced viscosity | | |
| Example | | | | | | | |
| 1 | 2.0 | 0.40 | 0 | No | — | 1.35 | >6 Months |
| 2 | 15.0 | 0.42 | 0 | No | — | 0.70 | >6 Months |
| 3 | 2.2 | 0.41 | 0 | No | — | 0.34 | >6 Months |
| 4 | 1.2 | 0.45 | 0 | No | — | 1.80 | >6 Months |
| 5 | 2.1 | 0.43 | 0 | No | — | 1.22 | >6 Months |
| Comparison Example | | | | | | | |
| 1 | 2.0 | 0.42 | 3 | Yes | 0.97 | 1.35 | 15 Days |

LL: lower limit according to relations (1) and (2)
$UL^1$: upper limit according to relation (1)
$UL^2$: upper limit according to relation (2)

What is claimed is:

1. A process for producing a methacrylate polymer, wherein a monomer feed composed of methyl methacrylate or a mixture of at least 70 weight % of methyl methacrylate and not more than 30 weight % of one or more vinyl monomers copolymerizable with methyl methacrylate is continuously bulk polymerized in a substantially perfect mixing state to give a polymer composition having a polymer content of 40–70% by weight in a continuous manner in a reactor, and wherein (i) the reactor is filled up with the polymer composition leaving substantially no gas phase therein and the polymer composition is stirred, (ii) the reactor is maintained in a thermally insulated state allowing substantially no exchange of heat with the external environment, (iii) the polymerization is conducted at a polymerization temperature in the range of 120° to 180° C., (iv) the average residence time is maintained in the range of 15 minutes to 2 hours, (v) a radical initiator having a half-life of not more than 1 minute at the polymerization temperature is used, and (vi) the radical initiator is adjusted to a concentration C (mol/100 g monomer) satisfying the following relation:

$$1.1 \times 10^{-4} \cdot \exp(0.019T) < C \cdot \Theta < 3 \times 10^{-8} \cdot \exp(0.079T) \quad (1)$$

where $\Theta$ represents average residence time (minute) and T represents polymerization temperature (°C.).

2. A process according to claim 1, wherein the concentration of the radical initiator C (mol/100 g monomer) satisfies the following relation:

$$1.1 \times 10^{-4} \cdot \exp(0.019T) < C \cdot \Theta < 3 \times 10^{-5} \cdot \exp(0.034T)$$

where $\Theta$ and T are as defined in claim 1.

3. A process according to claim 1, wherein the monomer feed comprises a mixture of at least 70 weight % of methyl methacrylate and not more than 30 weight % of one or more vinyl monomers copolymerizable with methyl methacrylate.

4. A process according to claim 3, wherein the monomer feed comprises a mixture of at least 80 weight % of methyl methacrylate and not more than 20 weight % of one or more vinyl monomers copolymerizable with methyl methacrylate.

5. A process according to claim 1, wherein the polymerization is conducted while controlling the reactor interior temperature and the reactor exterior wall temperature such that the temperature difference therebetween is less than about 5 degrees (°C.).

6. A process according to claim 1, wherein the polymerization temperature is 130° to 170° C.

7. A process according to claim 1, wherein the average residence time is in the range of 20 minutes to 1.5 hours.

8. A process according to claim 1, wherein the polymer composition is stirred using a stirring power of 0.5 to 20 $kW/m^3$.

9. A process according to claim 1, wherein the pressure within the reactor is maintained at $9.8 \times 10^5$ to $2.0 \times 10^6$ $nt/m^2$.

10. A process according to claim 1, wherein the concentration of the radical initiator C is 0.001 to 1 weight % based on the monomer feed.

11. A process according to claim 1, wherein a chain transfer agent is used.

12. A process according to claim 11, wherein the chain transfer agent is a mercaptan.

13. A process according to claim 12, wherein the mercaptan is used in an amount of 0.01 to 3 parts by weight per 100 parts by weight of the monomer or monomer mixture.

14. A process according to claim 1, which comprises the steps of (a) carrying out the bulk polymerization in the reactor which is filled up with the polymer composition leaving substantially no gas phase therein and which is maintained in a thermally insulated state allowing substantially no exchange of heat with the external environment at a polymerization temperature of 120°–180° C. with an average residence time of 15 minutes to 2 hours using a radical initiator having a half-life of not more than 1 minute at the polymerization temperature at a concentration which is equal to C (mol/100 g monomer) satisfying the following relation:

$$1.1 \times 10^{-4} \cdot \exp(0.019T) < C \cdot \Theta < 3 \times 10^{-8} \cdot \exp(0.079T)$$

where $\Theta$ represents average residence time (minute) and T represents polymerization temperature (°C.), (b) continuously withdrawing the polymer composition from the reaction zone, and (c) continuously removing volatile contents from the withdrawn polymer composition.

* * * * *